Aug. 18, 1959 S. SCHOEN 2,900,215

TRANSISTOR RECORD DRIVER

Filed July 5, 1955

| CONDITION OF RECORD HEAD | VOLTAGE | | TRANSISTOR CONDUCTING | CURRENT DIRECTION |
|---|---|---|---|---|
| | INPUT 7 | INPUT 8 | | |
| RECORD "ZERO" | 100 V. | 100 V. | 3 | ↑ |
| RECORD "ONE" | 125 V. | 125 V. | 4 | ↓ |
| NO RECORD | 125 V. | 100 V. | neither | none |

INVENTOR:
Seymour Schoen
Karl Berst
Louis A. Kline
By John J. Matlago, Agent
His Attorneys 2,900,215
Patented Aug. 18, 1959

2,900,215

TRANSISTOR RECORD DRIVER

Seymour Schoen, Los Angeles, Calif., assignor to The National Cash Register Company, Dayton, Ohio, a corporation of Maryland Application July 5, 1955, Serial No. 519,955

4 Claims. (Cl. 346—74)

This invention relates to recording circuitry and more particularly to an improved record driver circuit utilizing transistors therein.

In digital computer systems, a magnetic medium, e.g., magnetic tapes, is highly useful as a storage device. In order to record either a binary one or a binary zero on the magnetic tape, the record circuitry must saturate the tape into either of two oppositely polarized magnetic states. Ordinarily, the required reversal of polarization is effected by driving current in opposite directions through a record head. In a typical vacuum tube circuit, this polarization reversal is achieved by means of push-pull techniques which require that the windings on the record head be center-tapped. Inasmuch as only half of the windings on the head are then available for recording a given signal, twice the current is required in order to obtain the same output flux. Furthermore, the arrangement of a center-tapped record head complicates use of the same head for reading the tape, as is quite prevalent in practice. Thus, although suitable recording circuits have been designed in the past by use of vacuum tube techniques, it is highly desirable to have a recording circuit comprised of transistor components because of all the attendant advantages obtainable thereby, such as a small size, simplicity in design, low power requirements, and high output efficiencies.

The present invention utilizes junction transistors of both the p-n-p type and the n-p-n type. In order to be operable, a p-n-p type junction transistor requires means to bias the emitter electrode positively relative to the base electrode and means to bias the collector electrode negatively relative to the base electrode. On the other hand, in order for an n-p-n type junction transistor to be operable, means are required to bias the emitter electrode negatively relative to the base electrode and means to bias the collector electrode positively relative to the base electrode. The reason these two types of junction transistors are utilized is that they are particularly adaptable to a type of operation in which two similar, yet electrically opposite, devices can produce output currents of opposing directions. This technique of transistor operation thus offers a solution to the problem of providing and controlling the required current in record heads without need for resorting to center-tapped windings on the heads.

Briefly, the invention comprises a p-n-p type junction transistor and a n-p-n type junction transistor, each connected in a grounded emitter arrangement, i.e., with the emitters biased at fixed potential, and with the windings of a magnetic head acting as a common collector load impedance for both transistors. A current limiting resistor included in each respective collector lead essentially determines the magnitude of the current in the head winding. Signals to be recorded are applied onto the base of each transistor by way of voltage dividers for the purpose of reducing the reference level of the logical input signals which are usually at a much higher level than that required by a transistor, e.g., +100 to +125 volts swing as compared with +25 to +35 volts swing. Suitable capacitors are shunted across various resistors in the circuit in order to improve the transient response thereof. By applying the proper potentials to each of the base inputs, either one or the other of the transistors conducts so as to draw current through the head winding in one direction or the other.

It is, accordingly, an object of this invention to provide an improved record driver circuit utilizing junction transistors in a type of operation such that a required reversal in current in a magnetic head can be obtained without recourse to a center-tapped winding in the head.

It is another object of this invention to provide an improved record driver circuit in which a pair of junction transistors are operated as on-off type switches.

It is a still further object of this invention to provide a transistor record driver circuit that is relatively insensitive to variations in transistors used, and that provides effective control of current through the recording winding since this quantity is essentially determined by parameters external to the transistors.

These and other objects of this invention as well as a better understanding and comprehension thereof can be obtained by reference to the following detailed description of the drawing in which.

Figures 1, 2:
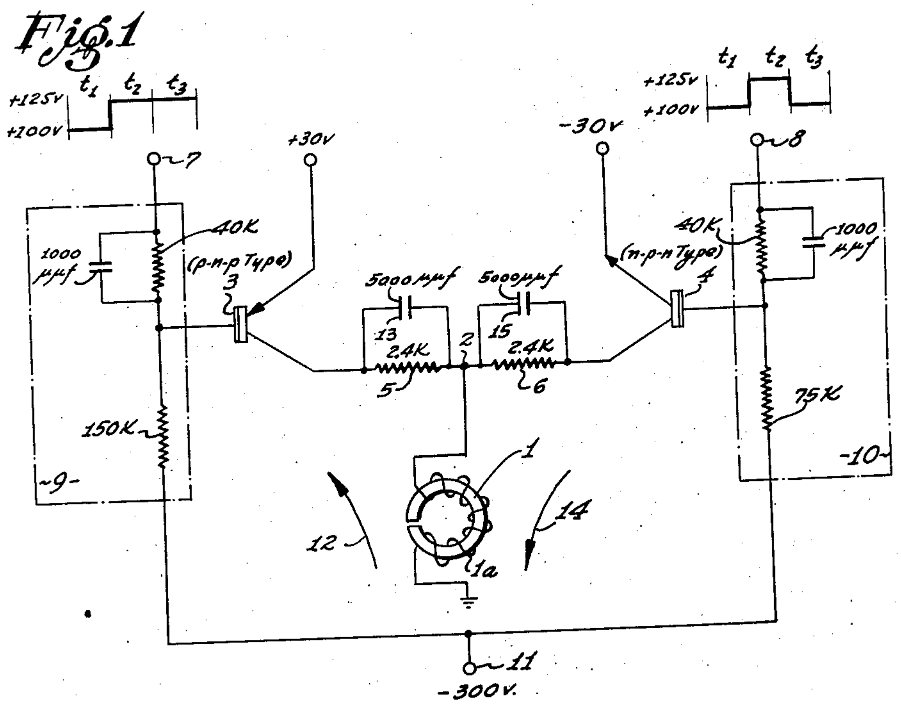
Fig. 1 is a schematic diagram of a preferred embodiment of the invention.
Fig. 2 is a table illustrative of various recording conditions of the circuit shown in Fig. 1.

Referring to Fig. 1, record head 1 has one end of its coil 1a grounded, while the other end thereof is connected to a circuit junction 2. A p-n-p type junction transistor 3 and an n-p-n type junction transistor 4 each have their collector electrode connected to circuit junction 2 by way of limiting resistors 5 and 6, respectively. The emitter electrode of p-n-p type junction transistor 3 is connected to a suitable positive fixed potential, e.g., +30 volts, and the emitter electrode of n-p-n type junction transistor 4 is connected to a suitable negative fixed potential, e.g., —30 volts.

The circuit responds to non-return-to-zero type digital signals, switching between +100 volts to +125 volts amplitude, e.g., as generated by digital computers. The signals on input 7 and input 8 are applied onto the base electrodes of transistors 3 and 4, by way of voltage dividers 9 and 10, respectively, which are both returned to a suitable negative bias at terminal 11, e.g., —300 volts. It is to be noted that use of voltage dividers 9 and 10 is optional with this circuit, the main purpose thereof being to reduce the reference level of the input signal to a value compatible with junction type transistors. It should be understood, however, that to enable one of the transistors to be in a heavily conducting state while the other is cut off in response to the common high-low voltage level signal applied to the inputs 7 and 8, the base electrodes of each of the transistors are biased at different voltage levels by means of biasing resistors 150K and 75K connected to the base of the transistors 3 and 4, respectively, as shown in Fig. 1.

As previously discussed, the purpose of this record driver circuit is to provide usable record signals by saturating a tape in one direction or the other. A "one" is recorded by conducting current through winding 1a of record head 1 in a direction opposite that required to record a "zero." The circuit can also be operated so that substantially no current is sent through the winding 1a of head 1. Whether a "one" or a "zero" is recorded is dependent upon which one of the two junction transistors 3 or 4 conducts. In order for n-p-n type junction transistor 4 to conduct, the base electrode must be positive with respect to the emitter electrode thereof. The conduction condition for the p-n-p type transistor 3, on the other hand, is just the opposite, i.e., the base electrode must be negative with respect to the emitter electrode.

Fig. 2 is a table indicative of the conduction status of each transistor in response to the input waveform signals and the resulting direction of current through winding 1a of record head 1 for recording a specific digit. Consider first time $t_1$, during which the waveforms on inputs 7 and 8 are both at the +100 volt level. Because of the voltage drop in voltage divider 9, the base potential of p-n-p type transistor 3 is now more negative than the emitter electrode thereof, e.g., +25 volts as compared with +30 volts are typical magnitudes. Similarly, because of the voltage drop in voltage divider 10, the base electrode potential of n-p-n type transistor 4 is also more negative than the emitter electrode thereof, e.g., −35 volts as compared with −30 volts are typical magnitudes. As a result, n-p-n type transistor 4 is cut off while p-n-p type transistor 3 conducts heavily, effectively becoming a low impedance switch. The electron current is thus upward in direction, as represented by arrow 12 in Fig. 1, following a path from ground through winding 1a of record head 1, the parallel combination of resistor 5 and capacitor 13 and into the collector electrode of p-n-p type transistor 3. This direction of conduction arbitrarily corresponds to a record "zero" flux condition.

When the input signals applied to inputs 7 and 8 both rise to a +125 volt level, as indicated by the waveforms during time $t_2$, the base electrodes of both transistors 3 and 4 rise to a higher positive potential than the emitter electrodes thereof, i.e., +35 volts as compared with +30 volts for p-n-p type transistor 3, and −25 volts as compared with −30 volts for n-p-n type transistor 4 are typical magnitudes. Thus n-p-n type transistor 4 conducts heavily, while p-n-p type transistor 3 is effectively cut off. The direction of electron current is now downward, as indicated by arrow 14 in Fig. 1, i.e., from the collector electrode of n-p-n type transistor 4, through the parallel combination of resistor 6 and capacitor 15, through winding 1a of record head 1 to ground. Thus a required reversal in current has been effected whereby a "one" can now be recorded instead of a "zero."

In case no signal is to be recorded, input 7 is maintained at +125 volts while input 8 is simultaneously at +100 volts as indicated by the input wave forms during time $t_3$. Both p-n-p type transistor 3 and n-p-n type transistor 4 are now effectively cut off because of adverse emitter-to-base electrode potentials existing thereon; only collector electrode cut-off current now passes therethrough. The net effect is negligible, however, inasmuch as the respective collector electrode cutoff currents for p-n-p type transistor 3 and n-p-n type transistor 4 pass in opposite directions in the head.

Inasmuch as the impedance of either transistor 3 or 4 is negligible when operated in its conducting state, practically all the steady-state voltage drop is across the collector resistor 5 or 6, respectively. Thus the value of these resistors essentially determines the amount of quiescent current in winding 1a of head 1. Thus, in the preferred embodiment of the invention shown, about 10 ma. of current is drawn through the head for saturating the tape in each state when resistors 5 and 6 each have a value of 2.4K. By-pass capacitors 13 and 15, having values of 5000 uuf., are utilized to improve the transient response of the circuit.

While the form of the invention shown and described herein is admirably adapted to fulfill the objects primarily stated, it is to be understood that it is not intended to confine the invention to the one form or embodiment disclosed herein, for it is susceptible of embodiment in various other forms.

What is claimed is:

1. A magnetic recording means comprising: a recording-head winding; a pair of transistors including one of n-p-n type and one of p-n-p type and each comprising an emitter, a base, and a collector and each connected to pass its respective collector current through said winding; first and second signal input means each receiving a respective signal input each comprising a respective series of binary "1's" and "0's" all of substantially the same time duration and the "1's" being evidenced by a higher input potential level and the "0's" being evidenced by a lower input potential level separated from the higher input potential level by a substantially uniform potential difference; a first bias circuit means connected to said first signal input means and connected to the emitter-base circuit of a first one of said transistors and effective to bias that transistor to conduction in response to reception of a binary "0" signal on that input means and to bias that transistor to cut-off in response to reception of a binary "1" signal on that input means; a second bias circuit means connected to said first bias circuit means and to said second signal input means and connected to the emitter-base circuit of the second one of said transistors and effective to bias that transistor to conduction in response to reception of a binary "1" signal on that input means and to bias that transistor to cut-off in response to reception of a binary "0" signal on that input means; whereby upon concurrent receipt of a binary "1" signal on one of said input means and a binary "0" signal on the other of said input means, substantially no current flows through said winding, and upon concurrent receipt of like binary signals on both of said input means a current will flow through said winding in a direction dependent upon which type of signal is received at said input means.

2. A magnetic recording means comprising: a recording-head winding; means comprising a pair of transistors including one of n-p-n type and one of p-n-p type and each including an emitter, a base, and a collector and each arranged and connected to pass its emitter-collector circuit current through said winding in a respective one of first and second opposite directions; means normally applying a positive bias on the emitter-collector circuit of a first one of said transistors and a negative bias on the emitter-collector circuit of the other of said transistors; first and second signal input means each effective to receive a respective electrical signal series, the signals each being evidenced by time periods of equal duration and each period immediately following a preceding period and the periods being of two characters the first of which is characterized by one signal potential level represented by "1" and the second of which is characterized by another potential level represented by "0," the signals being synchronous and the "1's" and "0's" in either signal being received in a generally irregular order representative of binary-coded information; means including a source of potential, and first and second biasing means each connected between said source of potential and a respective one of said signal input means and each connected to a respective transistor base and said biasing means being so constructed and arranged as to bias one of said transistors to cut-off incident to reception of a "1" signal on the respective input means and to conduction incident to reception of a "0" signal on that input means, and said biasing means also being so constructed and arranged as to bias the other of said transistors to cut-off incident to reception of a "0" signal on the respective input means and to conduction incident to reception of a "1" signal on that input means; whereby upon contemporaneous reception of a binary "1" on both of said input means an emitter-collector current flows in one direction through said winding, and upon contemporaneous reception of a binary "0" on both of said input means an emitter-collector current flows in the opposite direction through said winding, and upon contemporaneous reception of a binary "1" on either of said input means and a binary "0"

on the other of said input means, substantially no emitter-collector current flows through said winding.

3. Means for magnetically recording signals representing binary characters and which signals consist of series of substantially equal-duration intervals each characterized by a potential level selected from among first and second potential levels one of which indicates a binary "1" and the other of which indicates a binary "0" and which potential levels differ by a selected potential difference value and which signals indicating a given one of "0" and "1" occur in a generally irregular order determined by information represented by the signals, said means comprising: a magnetic recording-head having a driving coil; a pair of transistors, including one of n-p-n type and one of p-n-p type and each of which comprises a base, an emitter, and a collector, and each of which is connected for flow of its respective collector current through said coil in a direction opposite that of the other; first and second input line means on which respective series of said signals are impressed; a source of potential of value selected from potential value ranges above the higher and below the lower of said first and second potential levels, respectively; first biasing means interconnecting said source and said first input line means and connected to bias a first one of said transistors into conduction in response to impression of said first potential level on said first input line means and to bias said first one of said transistors to cut-off in response to impression of said second potential level on said first input line means; second biasing means interconnecting said source and said second input line means and connected to bias the other of said transistors into conduction in response to impression of said second potential level on said second input line means and to bias said other of said transistors to cut-off in response to impression of said first potential level on said second input line means; and means providing a bias of one polarity for the emitter of said p-n-p transistor and a bias of the opposite polarity for the emitter of said n-p-n transistor; whereby upon contemporaneous impression of respective signals of said second potential level on said first and second input means a first one of said transistors conducts while the second is biased to cut-off, upon contemporaneous impression of respective signals of said first potential level on said first and second input means the second of said transistors conducts while the first is biased to cut-off, and upon contemporaneous impression of signals of differing potential upon respective of said first and second input means both of said transistors are biased to the same state.

4. Means for magnetically recording on a magnetic tape a series of binary signals each of which immediately succeeds a preceding signal of the series without appreciable time lapse therebetween and each of which signals is evidenced by a time interval during which an electric potential is at a substantially constant potential level selected from among first and second potential levels separated by a substantially constant potential difference and a signal of said first level representing a binary signal of one character represented by "1" and a signal of said second level representing a binary signal of opposite character represented by "0," said means comprising: first and second signal input means to which said signals are applied; a recording-head winding; a pair of transistors; and biasing and potential source means for said transistors connected to said signal input means and effective upon application to said signal input means of binary signals of either of said characters to render conductive a first one of said transistors and to pass the current conducted thereby through said winding in a first direction and concurrently render the second of the transistors non-conductive, and effective upon change of application of signal to said input means to a binary signal of the opposite character, to substantially instantaneously reverse the conductivity status of the two transistors and pass the current conducted by the second of the transistors through said winding in a direction opposite said first direction; whereby the substantially instantaneous shifts of signal input from one to another of said binary signals of opposite character results in substantially simultaneous shifts of current flow from maximum level in one direction to maximum level in the opposite direction so distinct demarkation of representations of binary "1" from representations of binary "0" may be produced by the said recording head winding.

References Cited in the file of this patent

UNITED STATES PATENTS

| | | |
|---|---|---|
| 2,622,212 | Anderson | Dec. 16, 1952 |
| 2,633,402 | Flemming | Mar. 31, 1953 |
| 2,655,609 | Shockley | Oct. 13, 1953 |
| 2,666,818 | Shockley | Jan. 19, 1954 |

OTHER REFERENCES

"Transistor Circuit and Application," by G. C. Sziklai, Electronic Engineering, September 1953, pp. 358–364.

"Complementary Symmetry," by Robert D. Lohman, Electronics, September 1953, pp. 140–143.